(12) United States Patent
Abe

(10) Patent No.: US 6,281,660 B1
(45) Date of Patent: Aug. 28, 2001

(54) BATTERY CHARGER FOR ELECTRIC VEHICLE

(75) Inventor: Kunihiro Abe, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/545,032

(22) Filed: Apr. 6, 2000

(30) Foreign Application Priority Data

Apr. 9, 1999 (JP) .................................................. 11-102976

(51) Int. Cl.$^7$ ....................................................... H02J 7/00
(52) U.S. Cl. ................................................................. 320/103
(58) Field of Search ..................................... 320/103, 104

(56) References Cited

U.S. PATENT DOCUMENTS

| | | | |
|---|---|---|---|
| 5,448,152 | * | 9/1995 | Albright ................................. 320/104 |
| 6,037,744 | * | 7/1998 | Rhodes ................................... 320/104 |
| 6,037,745 | * | 7/1998 | Koike et al. ........................... 320/104 |

FOREIGN PATENT DOCUMENTS

| | | |
|---|---|---|
| 9284913 | 10/1997 | (JP) . |
| 10300082 | 5/2000 | (JP) . |

\* cited by examiner

Primary Examiner—Peter S. Wong
Assistant Examiner—Pia Tibbits
(74) Attorney, Agent, or Firm—Martin A. Farber

(57) ABSTRACT

Disclosed is a battery charger for an electric vehicle, which prevents capacitors in a circuit section from being deteriorated even when the circuit section is not used over a long period of time and can therefore charge reliably a main battery supplying power to an engine. The battery charger comprises a circuit section having capacitors for rectifying and boosting an AC input voltage; a converter section for converting a DC input voltage to an AC output voltage, boosting the AC voltage to a predetermined voltage level, and applying the AC voltage of a predetermined voltage level to the capacitors of the circuit section; and a switch section placed between a high voltage battery and the circuit section for disconnecting the high voltage battery from the circuit section when the high voltage battery is not charged, and connecting the high voltage battery to the circuit section when the high voltage battery is charged.

6 Claims, 2 Drawing Sheets

BATTERY CHARGER FOR ELECTRIC VEHICLE

BACKGROUND OF THE INVENTION

1. Field of the Invention

The present invention relates to a battery charger for an electric vehicle, which charges a main battery for feeding drive power to a motor.

2. Description of the Related Art

Electronic vehicles are generally classified into an ordinary electric vehicle which uses only a motor as the drive source for running and a hybrid vehicle which uses both the engine and motor as its drive sources. The hybrid vehicle fundamentally requires no external charging but needs the motor power to start the engine. When the main battery which feeds power to the motor is discharged, therefore, it is not possible to drive the hybrid vehicle as well as the ordinary electric vehicle which has the motor as its sole drive source. Therefore, even a hybrid vehicle should be equipped with some means which can charge the main battery in an emergency, in addition to the normal vehicle-mounted charging system.

One example of known means for charging the main battery in an emergency is a charger which charges the main battery of a vehicle where the charger is installed by using both a DC 12-V battery source installed in this vehicle and a DC 12-V battery source installed in another gasoline-engine vehicle or the like. Japanese Unexamined Patent Application Publication (KOKAI) No. 9-284913 discloses a technique of eliminating a charger from a vehicle, thus improving the usage of the vehicle and making the vehicle lighter. This is specifically accomplished by installing a charging motor, which is drivable on a domestic supply voltage or a commercially available supply voltage, in a vehicle and supplying the charging motor with power from outside the vehicle to thereby charge the battery with the generator output.

When a charger is not installed in a vehicle, however, it is not possible to cope with an emergency case where a domestic supply voltage or a commercially available supply voltage cannot be used as an external supply voltage. Even if a charger which uses a DC 12-V battery designed for usage in an emergency is installed in a vehicle, on the other hand, this charger is not used frequently. If this charger fails, therefore, it is likely that a user does not notice the failure until its use in an emergency.

The present inventor proposed a solution to this shortcoming in Japanese Patent Application No. 10-300082. The charger according to this prior art comprises a DC-AC inverter which converts a DC input voltage to an AC voltage and boosts the AC voltage to a predetermined voltage level and a voltage doubler section which boosts the AC voltage output from the DC-AC inverter or an AC voltage input without intervening the DC-AC inverter to a doubled voltage and rectifies this voltage. This single charger can therefore allow the main battery to be charged with both a DC voltage supply and an AC voltage supply.

As it is not often that the main battery is charged, the voltage doubler section is not used frequently. When the voltage doubler section has an ordinary structure comprising diodes and capacitors, the capacitors are deteriorated if the voltage doubler section is not used over a long period of time. While the prior art proposed by the present inventor can improve the frequency of usage of the DC-AC inverter, the prior art still has a room for improvement on such deterioration of capacitors.

The capacitors that constitute a voltage doubler section are normally electrolytic capacitors. It is well known that if electrolytic capacitors are not used for a long period of time, the impairment of the chemical conversion coating is apt to be quickened in a loadless state.

If the main battery is to be charged in an emergency with the voltage doubler section unused over a long period of time, therefore, a large leak current may flow through the electrolytic capacitors of the voltage doubler section so that the output voltage does not rise to a specified level.

SUMMARY OF THE INVENTION

Accordingly, it is an object of the present invention to provide a battery charger for an electric vehicle, which prevents capacitors in an incorporated voltage doubler section from being deteriorated even when the voltage doubler section is not used over a long period of time and can permit a main battery to be charged reliably in an emergency.

To achieve the above object, according to one aspect of this invention, there is provided a battery charger for an electric vehicle equipped with a main battery for feeding drive power to motors, which comprises a voltage doubler section having capacitors for rectifying and boosting an AC input voltage to a doubled voltage; a converter section for converting a DC input voltage to an AC voltage and boosting the AC voltage to a predetermined voltage level and normally applying the AC voltage of the predetermined voltage level to the capacitors of the voltage doubler section; and a switch section, intervened between the main battery and the voltage doubler section, for disconnecting the main battery from the voltage doubler section when the main battery is not charged and connecting the main battery to the voltage doubler section at a time of charging the main battery.

This battery charger may further comprise an electrical outlet for external input and output, provided between the converter section and the voltage doubler section, for inputting an AC voltage from an external voltage supply to the voltage doubler section and outputting the AC voltage from the converter section to an external unit.

In the battery charger according to this invention or the modification, the switch section may be constituted by an electromagnetic relay which performs a time delay operation at a predetermined charge time.

When the main battery for feeding drive power to motors is not charged, the main battery is disconnected from the voltage doubler section and an AC voltage from the converter section is always applied to the capacitors of the voltage doubler section. In an emergency where the main battery needs to be charged, the main battery is connected to the voltage doubler section so that the main battery is charged with the rectified DC output of the voltage doubler section.

In this case, providing the electrical outlet for external input and output between the converter section and the voltage doubler section can permit an AC voltage from an external voltage supply to be input to the voltage doubler section without intervening the converter section, thereby charging the main battery. When the main battery need not be charged, the AC output from the converter section can be acquired from the electrical outlet and used for other purposes. Further, as the switch section is constituted by an electromagnetic relay which performs a time delay operation at a predetermined charge time, it is possible to charge the main battery only for the predetermined charge time and prevent overcharging of the main battery.

DETAILED DESCRIPTION OF THE PREFERRED EMBODIMENT

Figure 1:
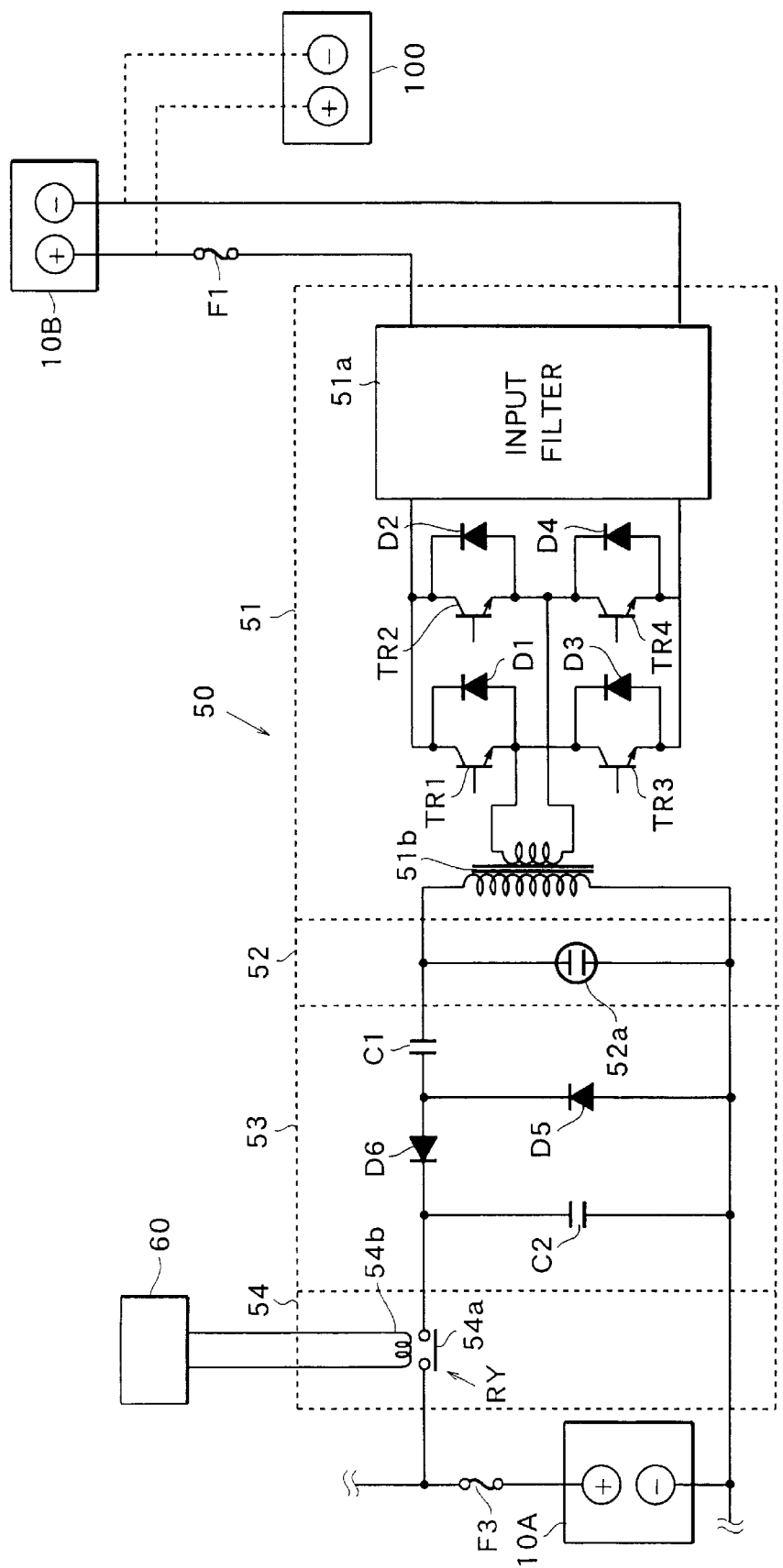
FIG. 1 is a structural diagram of a battery charger according to one embodiment of this invention.
Figure 2:
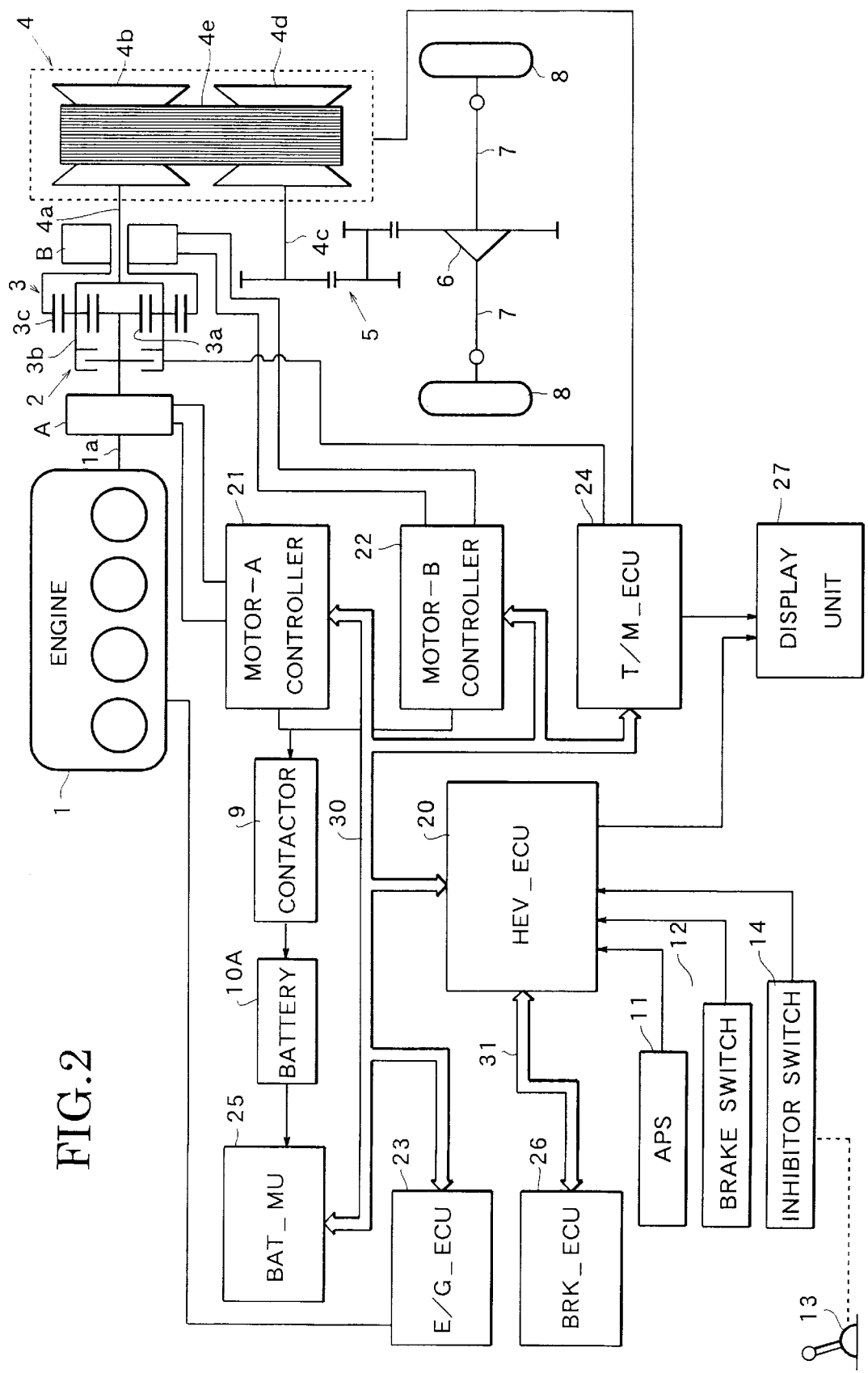
FIG. 2 is a system structural diagram of a hybrid vehicle.

A preferred embodiment of the present invention will now be described with reference to the accompanying drawings. FIGS. 1 and 2 illustrate one embodiment of this invention. FIG. 1 is a structural diagram of a battery charger according to one embodiment of this invention, and FIG. 2 is a system structural diagram of a hybrid vehicle.

FIG. 2 shows the control system of an electric vehicle or a hybrid vehicle which uses both an engine and motor. This hybrid vehicle has a drive system that basically comprises an engine 1, a motor A which starts the engine, generates power and performs power assist, a planetary gear unit 3 which is coupled via the motor A to the output shaft 1a of the engine 1, a motor B which controls the function of the planetary gear unit 3, becomes a drive power source when the vehicle starts moving or moves backward and recovers the regenerated power at the time of deceleration, and a power converting mechanism 4 which changes gears and amplifies the torque to carry out transmission power conversion at the time the vehicle runs.

The planetary gear unit 3 is of a single pinion type that has a sun gear 3a, a carrier 3b for rotatably supporting a pinion which engages with this sun gear 3a and a ring gear 3c which engages with the pinion. There is provided a lock-up clutch 2 which connects the sun gear 3a to the carrier 3b and disconnects them from each other.

While a transmission which has a combination of gears, a transmission which uses a fluid torque converter, or the like can be used as the power converting mechanism 4, it is desirable to use a belt type continuously variable transmission (CVT) which has a drive belt 4e put around a primary pulley 4b rotatably supported on an input shaft 4a and a secondary pulley 4d rotatably supported on an output shaft 4c. The power converting mechanism 4 will be described as CVT 4 in the following description.

In the drive system of the hybrid vehicle according to this embodiment, the planetary gear unit 3 having the lock-up clutch 2 intervened between the sun gear 3a and the carrier 3b is located between the output shaft 1a of the engine 1 and the input shaft 4a of the CVT 4. The sun gear 3a of the planetary gear unit 3 is coupled to the output shaft 1a of the engine 1 via one motor A, the carrier 3b is coupled to the input shaft 4a of the CVT 4 and the other motor B is coupled to the ring gear 3c. A differential mechanism 6 is coupled via a series of reduction gears 5 to the input shaft 4a of the CVT 4. Front or rear drive wheels 8 are coupled via a drive shaft 7 to this differential mechanism 6.

As mentioned above, the engine 1 and motor A are coupled to the sun gear 3a of the planetary gear unit 3 and the motor B is coupled to the ring rear 3c to provide power from the carrier 3b and the power from the carrier 3b is transmitted to the drive wheels 8 through gear change and torque amplification. Therefore, the two motors A and B can be used to both generate power and supply drive power so that relatively small-power motors can be used for the motors A and B.

As the lock-up clutch 2 is set to couple the sun gear 3a and carrier 3b of the planetary gear unit 3 together in accordance with the running conditions, the drive shaft that is directly coupled to the engine 1 and extends from the engine 1 to the CVT 4 with the two motors A and B located therebetween can be formed. This drive shaft can efficiently transmit drive power to the CVT 4 or can permit the use of braking force from the drive wheels 8.

See Japanese Patent Application No. 10-4080 filed by the present Applicant for the detailed description of the transmission of torques generated by the engine 1 and the motors A and B and the flow of the electricity generated by power generation of the engine 1 and the motors A and B, both via the planetary gear unit 3.

The hybrid control system which controls the above-described hybrid vehicle comprises a hybrid electric vehicle electronic control unit (HEV_ECU) 20 which controls the entire system, a motor-A controller 21 which controls the driving of the motor A, a motor-B controller 22 which controls the driving of the motor B, an engine electronic control unit (E/G_ECU) 23, a transmission electronic control unit (T/M_ECU) 24 which controls the lock-up clutch 2 and the CVT 4, a battery management unit (BAT_MU) 25 which mainly manages the power of a main battery (high-voltage battery) 10A that supplies power to the motors A and B, and a brake electronic control unit (BRK_ECU) 26 which controls braking. The HEV_ECU 20, the motor-A controller 21, the motor-B controller 22, the E/G_ECU 23, the T/M_ECU 24 and the BAT_MU 25 are connected to the HEV_ECU 20 by a first multiplex communication line 30. The BRK_ECU 26 is connected to the HEV_ECU 20 by an exclusive second multiplex communication line 31.

The HEV_ECU 20 performs the general control of the control system. Connected to the HEV_ECU 20 are various sensors and switches that detect the driver's manipulation states, such as an accelerator pedal sensor (APS) 11 which detects the amount of an unillustrated accelerator pedal (not shown) the driver steps on, a brake switch 12 which is set ON when the driver steps on an unillustrated brake pedal, and an inhibitor switch 14, which is set ON when the operational position of a select mechanism 13 of the transmission is either in the P range or N range and is set OFF when the operational position of the select mechanism 13 is in a running range like the D range or R range.

The HEV_ECU 20 computes the required vehicle driving torque and determines the torque distribution of the drive system based on signals from the individual sensors and switches and data sent from the individual ECUs, and sends control commands to the individual ECUs.

The HEV_ECU 20 is also connected to a display unit 27 which includes various meters for indicating the running conditions of the vehicle, such as the vehicle speed, engine speed and battery charging status, and warning lamps which warn the driver when an abnormality occurs. This display unit 27 is also connected to the T/M_ECU 24 and displays the occurrence of an abnormality when an abnormality occurs in the HEV_ECU 20 and the T/M_ECU 24 carries out abnormal control in place of the HEV_ECU 20.

The motor-A controller 21 has an inverter for driving the motor A and fundamentally executes constant rotation control on the motor A in response to a servo ON/OFF command or a rotation-number command which is transmitted by multiplex communication from the HEV_ECU 20. The motor-A controller 21 feeds back the torque and the number of rotations of the motor A, the value of the current for the motor A and so forth to the HEV_ECU 20 and sends a torque restriction request and data such as a voltage value to the HEV_ECU 20.

The motor-B controller 22 has an inverter for driving the motor A and basically carries out torque control on the motor B in response to a servo ON/OFF (including forward rotation and reverse rotation) command or a torque command (generation) which is transmitted by multiplex communication from the HEV_ECU 20. The motor-B controller 22 feeds back the torque and the number of rotations of the motor B, the value of the current for the motor B and so forth to the HEV_ECU 20 and sends data such as a voltage value to the HEV_ECU 20.

The E/G_ECU 23 basically performs torque control on the engine 1. The E/G_ECU 23 controls the amount of fuel injection from unillustrated injectors, the throttle position or the throttle angle under ETC (Electronic Throttle Control), power compensation learning of accessories such as an air-conditioning system, fuel cutting and so forth based on control commands, such as positive and negative torque commands, a fuel cutting command and an air-conditioning ON/OFF command, actual torque feedback data, the vehicle speed, the transmission gear position (P range, N range or the like) detected by the inhibitor switch 14, fully-open-accelerator data and fully-closed-accelerator data from the APS 11, the ON/OFF state of the brake switch 12 and the activation states of brake systems including an ABS (Antilock Brake System).

The E/G_ECU 23 feeds back the control torque value for the engine 1, an instruction to execute fuel cutting, an instruction to correct the amount of fuel injection by the fully-open increment, the ON/OFF state of the air-conditioning system, throttle-valve fully-closed data provided by an unillustrated idle tracking switch, and so forth to the HEV_ECU 20, The E/G_ECU 23 also sends requests, such as a request to warm up the engine 1, to the HEV_ECU 20.

The T/M_ECU 24 controls the connection and disconnection of the lock-up clutch 2 and the gear ratio of the CVT 4 based on information transmitted by multiplex communication from the HEV_ECU 20, such as the target number of rotations of the primary pulley of the CVT 4, a CVT input torque instruction, control commands including a lock-up request, the number of rotations of the engine 1 (engine speed), the position of the acceleration pedal, the selected gear position given by the inhibitor switch 14, the ON/OFF state of the brake switch 12 and the activation states of the brake systems including the ABS, and throttle-valve fully-closed data provided by the idle tracking switch.

The T/M_ECU 24 feeds back data, such as the vehicle speed, an input restricting torque, the number of rotations of the primary pulley and the number of rotations of the secondary pulley of the CVT 4, completion of lock-up and the gear state corresponding to the inhibitor switch 14 to the HEV_ECU 20. The T/M_ECU 24 also sends requests, such as an engine speed increase request to increase the amount of the oil of the CVT 4 and a low-temperature start request to the HEV_ECU 20.

The BAT_MU 25, which is a so-called power management unit, performs various controls, such as battery charge/discharge control, fan control and external charge/discharge control, to manage the high-voltage battery 10A serving as the voltage supply for the motors A and B and a low-voltage battery 10B (see FIG. 1) serving as the voltage supply for various accessories and control devices. The BAT_MU 25 sends data indicating the amount of remaining capacity of the high-voltage battery 10A, and the voltage and the current limit value of the battery 10A and data indicating that external charging is in progress to the HEV_ECU 20 by multiplex communication. When the high-voltage battery 10A is externally charged, a contactor 9 is switched to disconnect the high-voltage battery 10A from the motor-A controller 21 and the motor-B controller 22.

The BRK_ECU 26 computes the necessary braking force and controls the hydraulic pressures of the brake systems based on information transmitted by multiplex communication from the HEV_ECU 20, such as the regeneratable amount and regeneration torque feedback data. The BRK_ECU 26 feeds back a regeneration amount instruction (torque instruction), the vehicle speed, hydraulic pressures and the activation states of the brake systems including the ABS to the HEV_ECU 20.

The high-voltage battery 10A which supplies power to the motors A and B is constructed as, for example, a battery assembly which comprises a plurality of unit batteries each having a plurality of cells and has a nominal voltage of 240 V. While the vehicle is running, the high-voltage battery 10A is charged with the power generated by the motor A or the regenerated power from the motor B. When the capacity of the high-voltage battery 10A drops due to the vehicle being left inactivated over a long period of time or some other reasons and emergency charging is required, the high-voltage battery 10A can be charged by a charger 50 in FIG. 1 located in a trunk room or the like using the DC 12-V battery installed in the vehicle or a domestic single-phase AC 100-V voltage supply.

As shown in FIG. 1, the charger 50 has the basic structure including a converter section 51 which converts a DC input voltage to an AC voltage and boosts the AC voltage to a predetermined voltage, a voltage doubler section 53 which boosts the AC voltage output from the converter section 51 or an input AC voltage from an external voltage supply outside the vehicle to a doubled voltage and converts the doubled voltage to a DC voltage, and an external input/output section 52 which inputs the AC voltage from the external voltage supply to the voltage doubler section 53 and outputs the AC voltage from the converter section 51 to an external unit. The charger 50 further has a switch section 54 which passes or shuts off the rectified DC output from the voltage doubler section 53 and connects the voltage doubler section 53 to the high-voltage battery 10A only for a predetermined time needed to charge the battery 10A.

The converter section 51 is a DC-AC inverter which is basically a bridge circuit comprised of NPN type transistors TR1 to TR4, and has an input filter 51a for inputting a DC voltage and a transformer 51b for boosting the output of the bridge circuit. The positive side of the low-voltage (DC 12-V) battery 10B installed in the local vehicle is connected via a fuse F1 to the positive input of the input filter 51a, and the negative side of the low-voltage battery 10B is connected to the ground side of the input filter 51a.

The collectors of the transistors TR1 and TR2 are connected together to the positive output side of the input filter 51a. The emitters of the transistors TR1 and TR2 are respectively connected to the collectors of the transistors TR3 and TR4 and also to the primary winding of the transformer 51b. The emitters of the transistors TR3 and TR4 are connected together to the ground side of the input filter 51a. Each of flywheel diodes D1, D2, D3 and D4 are connected between the collector and emitter of the associated one of the transistors TR1, TR2, TR3 and TR4.

The bases of the individual transistors TR1 to TR4 are connected to an unillustrated control circuit in the BAT_MU 25. Signals from this control circuit turn on or off those transistors TR1–TR4 to thereby control the operation of the inverter.

In this embodiment, the external input/output section 52 is an electrical outlet 52a connected in parallel between the secondary winding of the transformer 51b and the voltage doubler section 53 and allows the AC output from the secondary winding of the transformer 51b to be used on an external unit. This electrical outlet 52a provides the voltage doubler section 53 with the commercially available supply voltage so that the high-voltage battery 10A can be charged without using the output of the converter section 51.

In this embodiment, the voltage doubler section 53 is a half-wave voltage doubler section which comprises diodes D5 and D6 and capacitors C1 and C2 (C1<C2). Specifically, one end of the capacitor C1 is connected to the secondary winding of the transformer 51b and the other end of the capacitor C1 is connected to the anode of the diode D6 and the cathode of the diode D5. The cathode of the diode D6 is connected to one end of the capacitor C2. The other end of the capacitor C2, the anode of the diode D5 and the ground terminal of the secondary winding of the transformer 51b are connected together to the negative side of the high-voltage battery 10A. It is to be noted that the negative side (ground side) of the high-voltage battery 10A is electrically insulated from the negative side (ground side) of the low-voltage battery 10B.

The switch section 54 is constituted by an electromagnetic relay RY which has a normally open relay contact 54a and a relay coil 54b connected to a charge timer 60. The relay contact 54a of the electromagnetic relay RY has one end connected to the positive side of the high-voltage battery 10A via a fuse F3 and the other end connected to a node between the cathode of the diode D6 and the capacitor 2 in the voltage doubler section 53.

The charge timer 60 is controlled by, for example, the BAT_MU 25 and a charge time corresponding to the remaining capacity of the high-voltage battery 10A detected by the BAT_MU 25 is set in the charge timer 60. The relay coil 54b of the electromagnetic relay RY is energized only for the charge time set in the charge timer 60, closing the relay contact 54a, so that the high-voltage battery 10A can be charged with the rectified DC output from the voltage doubler section 53 only for that charge time.

The charger 50 may be constructed by designing the converter section 51, the external input/output section 52 and the voltage doubler section 53 as an integrated unit with the electromagnetic relay RY connected to the integrated unit as an external element, or may be constructed by integrating all of those components including the electromagnetic relay RY.

According to the above-described hybrid vehicle, the high-voltage battery 10A is charged by the charging system which uses the power generated by the motor A or the regenerated power from the motor B. When no emergency charging by the charger 50 is necessary, the relay contact 54a of the electromagnetic relay RY is set open so that the charger 50 operates as the DC-AC inverter.

Under this situation, in the charger 50, the DC 12-V voltage from the low-voltage battery 10B installed in the local vehicle which is input via the input filter 51a of the converter section 51 is converted to an AC voltage by the bridge circuit of the transistors TR1–TR4. This AC voltage is boosted by the transformer 51b to a predetermined voltage which is applied to the capacitors C1 and C2 of the voltage doubler section 53.

The capacitors C1 and C2 of the voltage doubler section 53 are therefore always charged. With respect to a slight deterioration of the chemical conversion coating which occurs in a loadless state when electrolytic capacitors are used for the capacitors C1 and C2, therefore, aging is carried out by always applying the voltage to those capacitors C1 and C2 so that the capacitors C1 and C2 self-recover from the deterioration. That is, unlike the prior art, this embodiment does not cause the capacitors C1 and C2 of the voltage doubler section 53 to be left in a loadless state over a long period of time and thus prevents otherwise probable quickening of the deterioration of the capacitors. The high-voltage battery 10A can therefore be surely charged in an emergency.

In this case, the AC output of the converter section 51 can be acquired via the electrical outlet 52a. The secondary-winding output of the transformer 51b is set to have about the same level as the output of the domestic AC 100-V voltage supply. This allows the charger 50 to be used for leisure purposes or the like by connecting various kinds of devices which operate on an AC 100 V, such as a fluorescent type illuminator, to the electrical outlet 52a.

When the charging performance of the high-voltage battery 10A falls due to, for example, the vehicle running or left unused over a long period of time, the charger 50 is used for emergency charging of the high-voltage battery 10A with the supply voltage from a domestic single-phase AC 100-V voltage supply or the supply voltage from the DC 12-V battery installed in the vehicle.

To use the domestic AC 100-V voltage supply to charge the high-voltage battery 10A, the electrical outlet 52a of the charger 50 should be connected to the electrical outlet of the domestic AC 100-V via an unillustrated cable to directly input the voltage of AC 100 V to the voltage doubler section 53.

Specifically, the AC 100-V voltage is supplied to the electrical outlet 52a of the charger 50 and an unillustrated charge switch is set ON. As a result, the charge time corresponding to the remaining capacity of the high-voltage battery 10A is set in the charge timer 60, the relay coil 54b of the electromagnetic relay RY is energized in response to the output of the charge timer 60, closing the relay contact 54a and starting charging the high-voltage battery 10A with the rectified DC output from the voltage doubler section 53.

In the voltage doubler section 53, charging of the capacitor C1 via the diode D5 and charging of the capacitor C2 via the diode D6 are repeated every half cycle of the AC 100-V voltage input through the electrical outlet 52a, and the capacitor C2 is charged with the charge voltage of the capacitor C1 plus the voltage from the electrical outlet 52a. Therefore, the AC voltage input from the electrical outlet 52a is voltage-doubled by the diodes D5 and D6 and the capacitors C1 and C2 and becomes approximately double the maximum value of the AC voltage having an effective value of 100 V input from the electrical outlet 52a, i.e., a DC voltage of about 280 V, with which the high-voltage battery 10A having a nominal voltage of 240 V is charged.

When the charge time set in the charge timer 60 elapses, the output of the charge timer 60 is disabled, stopping energizing the relay coil 54b of the electromagnetic relay RY and setting the relay contact 54a open again. This disconnects the voltage doubler section 53 from the high-voltage battery 10A and stops charging of the battery 10A. The display unit 27 displays the completion of charging.

When the domestic AC 100-V voltage supply cannot be used due to a parking lot being far from the home or some other reasons, the high-voltage battery 10A is charged by using both the low-voltage battery 10B installed in the local vehicle and a DC 12-V battery installed in another assisting vehicle such as a gasoline-engine vehicle.

When the remaining capacity of the low-voltage battery 10B installed in the local vehicle is low, the 12-V low-voltage battery 10B of the local vehicle is connected to the DC 12-V battery installed in an assisting vehicle, with the positive and negative sides of the former battery connected to the same polarity sides of the latter battery, using an unillustrated booster cable or the like, and the unillustrated charge switch is set ON.

Consequently, the DC voltage from the DC 12-V battery input via the input filter 51*a* is converted to an AC voltage by the bridge circuit of the transistors TR1–TR4. This AC voltage is then boosted by the transformer 51*b* to AC 100 V. The AC output on the secondary winding side of the transformer 51*b* is voltage-doubled by the diodes D5 and D6 and the capacitors C1 and C2 and becomes a DC voltage of approximately 280 V.

Therefore, the high-voltage battery 10A can likewise be charged with the DC output of the voltage doubler section 53 via the relay contact 54*a* of the electromagnetic relay RY that is closed only for the predetermined charge time by the charge timer 60.

At the time of charging the high-voltage battery 10A in an emergency, an AC voltage is always applied to the capacitors C1 and C2 of the voltage doubler section 53 from the converter section 51. It is therefore possible to avoid causing such a situation that the deterioration of the capacitors C1 and C2 of the voltage doubler section 53, particularly the deterioration of the capacitor C1, inhibits the rectified output voltage of the voltage doubler section 53 from rising, thus disabling charging of the high-voltage battery 10A. This can permit the high-voltage battery 10A to be charged reliably.

In other words, keeping the converter section 51 and the voltage doubler section 53 of the charger 50 always active can elongate the service life of the capacitors of the voltage doubler section 53 as well as improve the rate of detecting a failure in the charger 50. This can lead to a significant improvement of the reliability of the whole system.

As apparent from the foregoing description, this invention has the following advantages.

When the main battery for feeding drive power to motors is not charged, the main battery is disconnected from the voltage doubler section and an AC voltage from the converter section is always applied to the capacitors of the voltage doubler section. This can prevent the capacitors of the voltage doubler section from being deteriorated as a consequence of the capacitors being left in a loadless state over a long period of time and can allow the main battery to be charged reliably even in an emergency. Further, as the converter section and the voltage doubler section are always kept active, the rate of detecting a failure in the charger can be improved, thus resulting in an improvement of the reliability of the whole system.

In this case, as the electrical outlet for external input and output is provided between the converter section and the voltage doubler section, an AC voltage from an external voltage supply can be input to the voltage doubler section without intervening the converter section in order to charge the main battery. When the main battery need not be charged, the AC output from the converter section can be acquired from the electrical outlet and used for other purposes. Furthermore, as the switch section is constituted by an electromagnetic relay which performs a time delay operation at a predetermined charge time, it is possible to charge the main battery only for the predetermined charge time and prevent overcharging of the main battery.

What is claimed is:

1. A battery charger for an electric vehicle equipped with a main battery for feeding drive power to motors, comprising:

a circuit section having capacitors for rectifying and boosting an AC input voltage to an increased voltage;

a converter section for converting a DC input voltage to an AC voltage and boosting said AC voltage to a predetermined voltage level and normally applying said AC voltage of said predetermined voltage level to said capacitors of said circuit section; and a switch section, intervened between said main battery and said circuit section, for disconnecting said main battery from said circuit section during a first interval of time when said main battery is not being charged and connecting said main battery to said circuit section at a second interval of time for a charging said main battery;

wherein said converter section maintains voltage on said capacitors of said circuit section during both said first time interval and said second time interval to inhibit deterioration of said capacitors.

2. The battery charger according to claim 1, further comprising an electrical outlet for external input and output, provided between said converter section and said circuit section, for inputting an AC voltage from an external voltage supply to said circuit section and outputting said AC voltage from said converter section to an electrical load separate from said battery charger.

3. The battery charger according to claim 2, wherein said switch section is constituted by an electromagnetic relay which performs a time delay operation at a predetermined charge time.

4. The battery charger according to claim 1, wherein said switch section is constituted by an electromagnetic relay which performs a time delay operation at a predetermined charge time.

5. The battery charger according to claim 1, wherein said circuit section is a voltage doubler.

6. The battery charger according to claim 1, wherein the capacitors of said circuit section include electrolytic capacitors.

* * * * *